(12) United States Patent
Nozue et al.

(10) Patent No.: US 11,354,081 B2
(45) Date of Patent: Jun. 7, 2022

(54) INFORMATION PROCESSING APPARATUS WITH CONCEALED INFORMATION

(71) Applicant: FUJIFILM Business Innovation Corp., Tokyo (JP)

(72) Inventors: Aiko Nozue, Kanagawa (JP); Koji Hashimoto, Kanagawa (JP); Toru Nakatani, Kanagawa (JP); Haruki Matsui, Kanagawa (JP); Takeshi Ogura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 443 days.

(21) Appl. No.: 16/162,407

(22) Filed: Oct. 17, 2018

(65) Prior Publication Data

US 2019/0129670 A1 May 2, 2019

(30) Foreign Application Priority Data

Oct. 26, 2017 (JP) .............................. JP2017-207590

(51) Int. Cl.
*G06F 3/12* (2006.01)
*H04N 1/00* (2006.01)
(52) U.S. Cl.
CPC .......... *G06F 3/1273* (2013.01); *G06F 3/1222* (2013.01); *G06F 3/1274* (2013.01); *H04N 1/00408* (2013.01)
(58) Field of Classification Search
None
See application file for complete search history.

(56) References Cited

U.S. PATENT DOCUMENTS

| 9,390,282 | B2 | 7/2016 | Liden et al. | |
| 2007/0067680 | A1* | 3/2007 | Harada | G06F 21/608 714/45 |
| 2015/0363601 | A1* | 12/2015 | Kamishiro | G06F 3/1222 726/26 |
| 2016/0088191 | A1* | 3/2016 | Sasagawa | G06F 3/1285 358/1.14 |

FOREIGN PATENT DOCUMENTS

| JP | 2006344126 | 12/2006 |
| JP | 2007087002 | 4/2007 |
| JP | 2013186508 | 9/2013 |
| JP | 2015115023 | 6/2015 |
| JP | 2017530460 | 10/2017 |

OTHER PUBLICATIONS

"Office Action of Japan Counterpart Application", dated Jun. 15, 2021, with English translation thereof, pp. 1-6.

* cited by examiner

*Primary Examiner* — Thomas D Lee
(74) *Attorney, Agent, or Firm* — JCIPRNET

(57) ABSTRACT

An information processing apparatus includes a collection unit that collects a first history on a monitoring target device, a display unit that displays a history screen including at least a part of the first history collected by the collection unit, a receiving unit that receives an operator's operation to designate information included in the first history, on the history screen displayed by the display unit, and a generation unit that generates a second history in which the information designated by the operator is concealed, from the first history.

7 Claims, 13 Drawing Sheets

FIG. 5A

| COLLECTED INFORMATION | KEYWORD | DATA KEY |
|---|---|---|
| APPLICATION LOG FILE | DEBUG, UI, ScimUserInfo info: | emails<br>phoneNumbers<br>name<br>nameKana<br>userName<br>organization<br>department<br>addresses |
| | DEBUG, UI, UserInfo | user |

FIG. 5B

| COLLECTED INFORMATION | TABLE NAME | COLUMN NAME |
|---|---|---|
| APPLICATION DB INFORMATION | DeviceInfo | IP_ADDRESS<br>ID_NAME<br>PASSWORD |
| | SystemSetting | — |
| | SearchSetting | IP_ADDRESS<br>ID_NAME |

FIG. 7

| COLLECTED INFORMATION LIST | COLLECTED INFORMATION/DETAIL | | | | CONCEALED INFORMATION DETAIL |
|---|---|---|---|---|---|
| PC ENVIRONMENT INFORMATION<br>APPLICATION LOG FILE<br>APPLICATION DB<br>>SyestemSettin<br>>DeviceInfo<br>>SearchSetting | PRIVATE_KEY | SERIAL_NUMBER | IP_ADDRESS | ID_NAME | PASSWORD | FUJI01<br>TARO01<br>user01@sample.co.jp<br>YYY CO., LTD.<br>XXX DEVELOPMENT DEPARTMENT<br>99-99<br>MINATO MIRAI NISHI-KU, YOKOHAMA-SHI<br>220-8668<br>KANAGAWA KEN<br>172.27.59.80<br>Administrator0<br>password0 |
| | 1 | NC100<br>4980/0<br>00050 | 172.27.59.80 | Administrator0 | password0 | |
| | 2 | NC100<br>4980/0<br>00051 | 172.27.59.81 | Administrator1 | password0 | |
| | 3 | NC100<br>4980/0<br>00052 | 172.27.59.82 | Administrator0 | password0 | |
| | 4 | NC100<br>4980/0<br>00053 | 172.27.59.83 | Administrator1 | password0 | |
| | 5 | NC100<br>4980/0<br>00054 | 172.27.59.84 | Administrator0 | password0 | |
| | 6 | NC100<br>4980/0<br>00055 | 172.27.59.85 | Administrator1 | password0 | |
| | 7 | NC100<br>4980/0<br>00056 | 172.27.59.86 | Administrator0 | password0 | |

[PROCESS START]

FIG. 8

CONCEALED CANDIDATE LIST

```
FUJI01
TARO01
user01@sample.co.jp
YYY CO., LTD.
XXX DEVELOPMENT DEPARTMENT
99-99
MINATO MIRAI NISHI-KU, YOKOHAMA-SHI
220-8668
KANAGAWA KEN
172.27.59.80
172.27.59.81
172.27.59.82
172.27.59.83
172.27.59.84
172.27.59.85
172.27.59.86
Administrator0
Administrator1
password0
```

FIG. 12

| CONTENTS OF OCCURRED FAILURE | CONCEALMENT RESTRICTION TABLE |
|---|---|
| FAILURE OCCURS DURING INSTALLATION OF APPLICATION IN DEVICE | DeviceInfo |
| FAILURE OCCURS ON DISPLAY OF MAIN SCREEN, AFTER MANAGEMENT APPLICATION LOGIN | SystemSetting |

FIG. 13

COLLECTED INFORMATION LIST
- 11 — PC ENVIRONMENT INFORMATION
- 12 — APPLICATION LOG FILE
- 13 — APPLICATION DB
  - 13a — >SyestemSettin
  - 13b — >DeviceInfo
  - 13c — >SearchSetting

COLLECTED INFORMATION DETAIL (21)

| PRIVATE KEY | SERIAL_NUMBER | IP_ADDRESS | ID_NAME | PASSWORD |
|---|---|---|---|---|
| 1 | NC100498/000050 | 172.27.59.80 | Administrator0 | password0 |
| 2 | NC100498/000051 | 172.27.59.81 | Administrator1 | password0 |
| 3 | NC100498/000052 | 172.27.59.82 | Administrator1 | password0 |
| 4 | NC100498/000053 | 172.27.59.83 | Administrator1 | password0 |
| 5 | NC100498/000054 | 172.27.59.84 | Administrator0 | password0 |
| 6 | NC100498/000055 | 172.27.59.85 | Administrator1 | password0 |
| 7 | NC100498/000056 | 172.27.59.86 | Administrator0 | password0 |

CONCEALED INFORMATION DETAIL (31)

```
FUJI01
TARO01
user01@sample.co.jp
YYY CO., LTD.
XXX DEVELOPMENT DEPARTMENT
99-99
MINATO MIRAI NISHI-KU, YOKOHAMA-SHI
220-8668
KANAGAWA KEN
```

[PROCESS START] (32)

INFORMATION PROCESSING APPARATUS WITH CONCEALED INFORMATION

CROSS-REFERENCE TO RELATED APPLICATIONS

This application is based on and claims priority under 35 USC 119 from Japanese Patent Application No. 2017-207590 filed Oct. 26, 2017.

BACKGROUND

(i) Technical Field

The present invention relates to an information processing apparatus.

(ii) Related Art

As a system which deletes secret information corresponding to a predetermined condition, for example, JP2015-115023A discloses a log data processing system in which a secret information range holding unit that holds deletion condition information which is a secret information range designated by an administrator and deletion pattern information which is condition of secret information which can be determined log data is prepared, a confidential condition extraction unit extracts a secret information condition which is a specific condition of a deletion target, from setting information of an analyzer, based on the deletion condition information, a secret information deletion unit deletes secret information from log data, based on the secret information condition and deletion pattern information, and thus secret information deletion log data is generated.

SUMMARY

Information to be concealed may be prevented from being made public by deleting information corresponding to a predetermined condition, before a history related to a monitoring target device is made public. However, since type of information to be concealed varies from time to time, information to be concealed may be made public without being deleted, in a case of deleting information based on fixed conditions.

Aspects of non-limiting embodiments of the present disclosure relate to an information processing apparatus that gives an operator an opportunity of designating information to be concealed, before the history about a monitoring target device is made public.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including a collection unit that collects a first history on a monitoring target device; a display unit that displays a history screen including at least a part of the first history collected by the collection unit; a receiving unit that receives an operator's operation to designate information included in the first history, on the history screen displayed by the display unit; and a generation unit that generates a second history in which the information designated by the operator is concealed, from the first history.

BRIEF DESCRIPTION OF THE DRAWINGS

Exemplary embodiment(s) of the present invention will be described in detail based on the following figures, wherein:

FIG. 5A is a diagram showing an example of a designation candidate table for an application log file; FIG. 5B is a diagram showing an example of a designation candidate table for application DB information;

FIG. 7 is a diagram showing a display example of the application DB information;

FIG. 8 is a diagram showing an example of a list screen of information pieces which are candidates for designation by the operator;

FIG. 12 is a diagram showing an example of a failure definition table for application DB information; and FIG. 13 is a diagram showing a display example of the application DB information.

DETAILED DESCRIPTION

Hereinafter, exemplary embodiments of the present invention will be described in detail with reference to the accompanying drawings.

Exemplary Embodiment 1

Entire Configuration of Information Processing System

Figure 1:
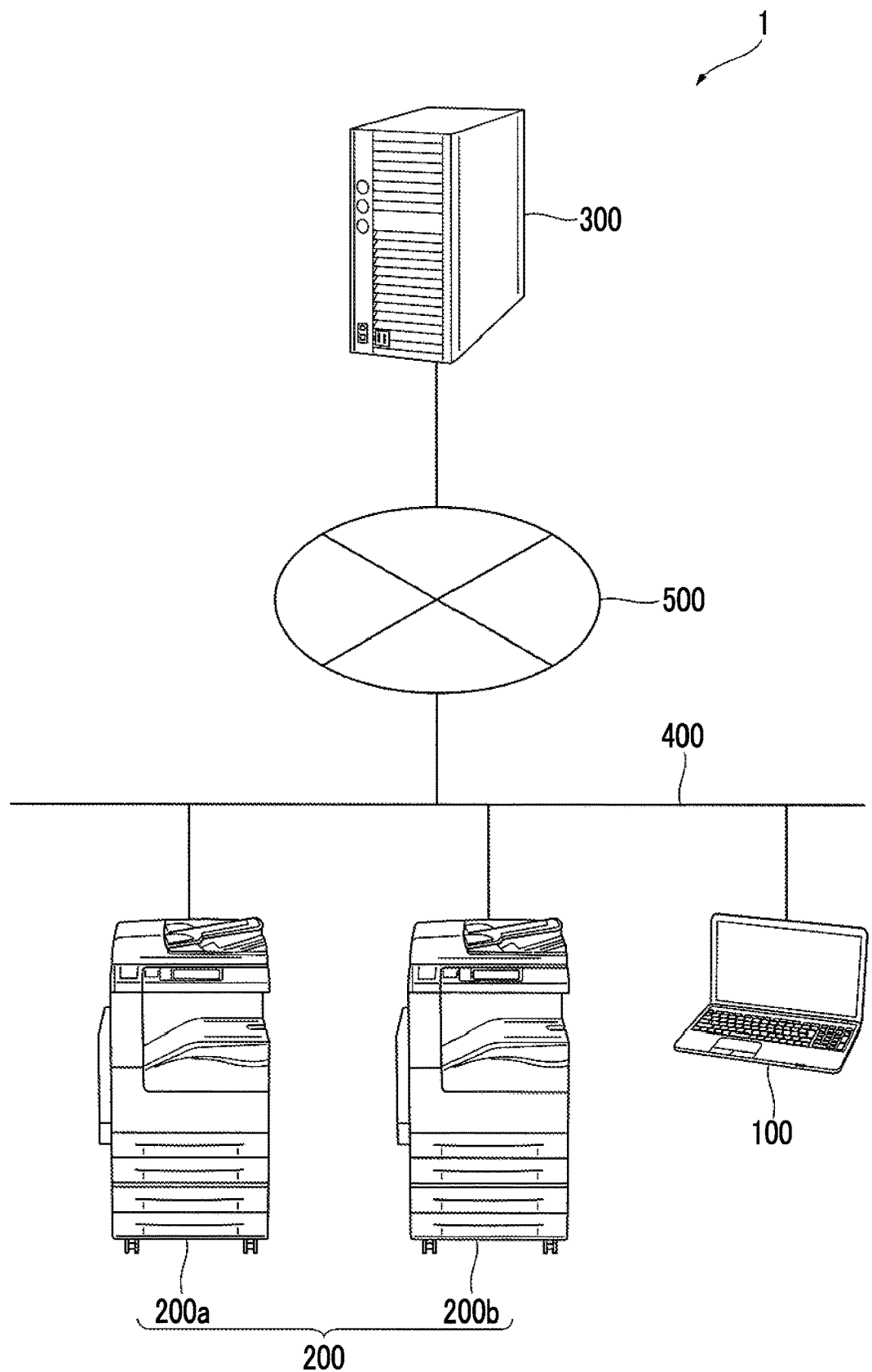
FIG. 1 is a diagram illustrating an entire configuration example of an information processing system according to the present exemplary embodiment.

First, the configuration of the entire configuration of an information processing system 1 according to the present exemplary embodiment will be described. FIG. 1 is a diagram illustrating an entire configuration example of the information processing system 1 according to the present exemplary embodiment. As illustrated, in the information processing system 1, a management terminal 100 and devices 200*a*, 200*b* are connected to a network 400. Further, an information management server 300 is connected to a network 500. Then, the management terminal 100 and the devices 200*a*, 200*b* are connected to the information management server 300 through the network 400 and the network 500.

The devices 200a, 200b are shown in FIG. 1, but in a case where it is unnecessary to distinguish them, they are referred to as a device 200. Further, only two devices 200 are shown in FIG. 1, but the number of devices 200 is not limited to two as illustrated.

The management terminal 100, which is an example of an information processing apparatus, is an apparatus that manages the device 200 and, for example, a personal computer (PC) or the like is exemplified. In the management terminal 100, an application for managing the device 200 (hereinafter, referred to as a management application) is installed, and the device 200 is managed by the management application.

More specifically, the management terminal 100 acquires from the device 200 various types of information on the device 200, such as the model of the device 200, the application installed in the device 200, the version of the application, and stores it. Further, the management terminal 100 acquires various applications and information on various applications provided by the information management server 300 from the information management server 300 and stores them. Then, the management terminal 100 displays the information acquired from the device 200 and the information management server 300 on the screen and presents it to the operator. Further, the management terminal 100 downloads the application provided by the information management server 300, and installs the downloaded application in the device 200. Further, the management terminal 100 upgrades or uninstalls the application installed in the device 200. As described above, by the management application, internal management of the management terminal 100 and processes between the management terminal 100, the device 200, and the information management server 300 are performed, and the device 200 is managed.

Here, as will be described in detail later, in a case of outputting various types of information to be stored in the management terminal 100, the management terminal 100 receives an operation to designate information to be concealed, in order to prevent information that the operator desires to conceal from being made public. Then, the management terminal 100 outputs various types of information with the information designated by the operator concealed.

The device 200 is a device that processes data, and is, for example, an image forming apparatus having a function of forming an image on a recording medium by an electrophotographic method or an inkjet method. However, the device 200 is not limited to the image forming apparatus, and for example, a PC, a portable information terminal, or the like is also exemplified.

The information management server 300 is an apparatus that manages an application (product) to be provided to the device 200 or information on the application. As the information management server 300, for example, a personal computer (PC), a workstation, or the like is exemplified. In response to a request from the management terminal 100, the information management server 300 transmits an application to the management terminal 100 or transmits information on an application that can be provided. The information transmitted by the information management server 300 is, for example, the name of an application that can be provided, the version of the application, the release date of the application, the model of the device 200 targeted by the application, and the like. Further, the files of the application may be stored in an apparatus other than the information management server 300. In that case, the information management server 300 manages the information on the uniform resource locator (URL) of the installer of the application.

The network 400 is a communication means used for information communication between the management terminal 100 and the device 200, and is, for example, a local area network (LAN).

The network 500 is a communication means used for information communication between the management terminal 100, the device 200 and the information management server 300, and is, for example, the Internet or a public line.

Hardware Configuration of Management Terminal

Figure 2:
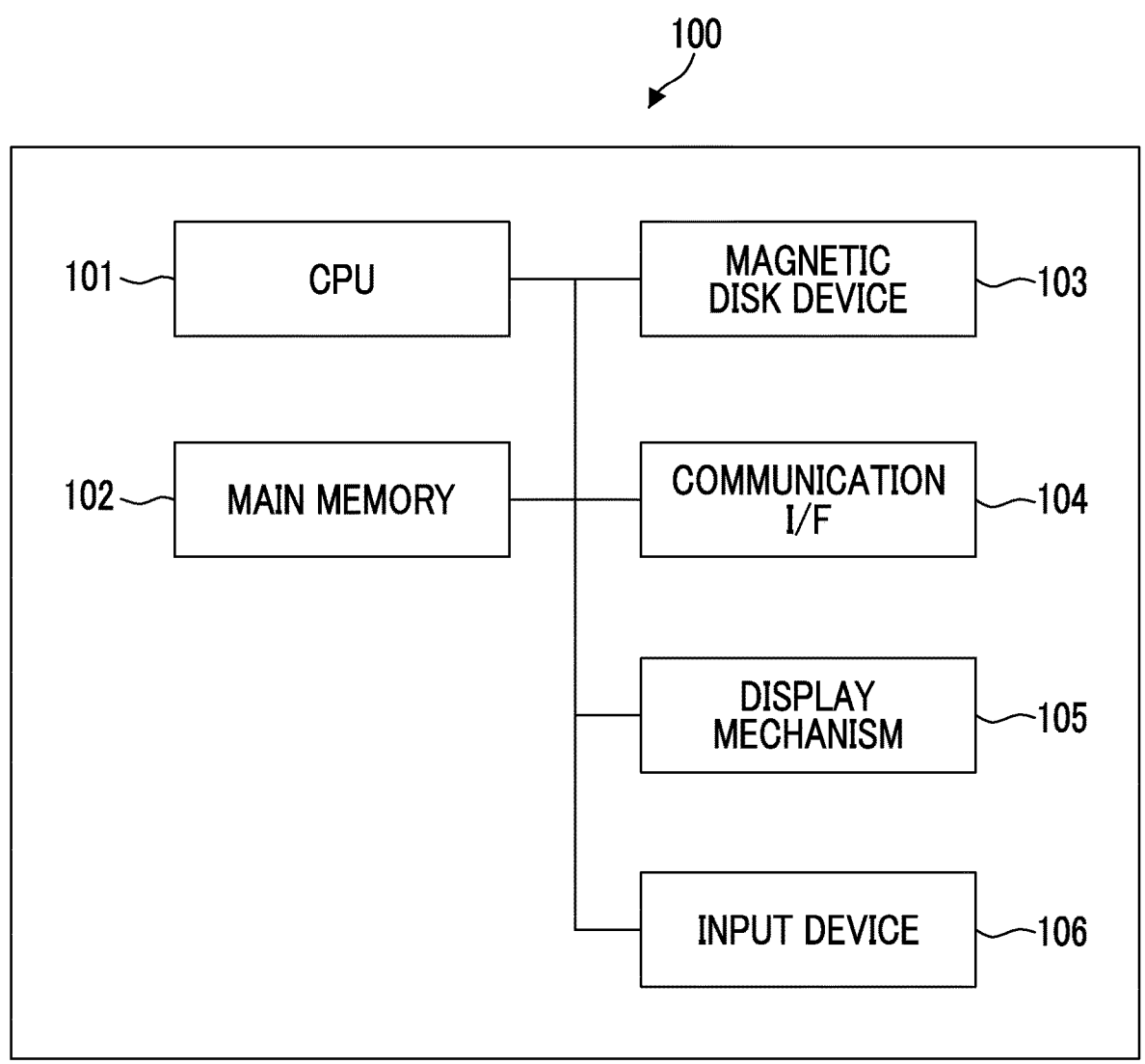
FIG. 2 is a diagram illustrating a hardware configuration of a management terminal according to the present exemplary embodiment.

Next, the hardware configuration of the management terminal 100 according to the present exemplary embodiment will be described. FIG. 2 is a diagram illustrating a hardware configuration of the management terminal 100 according to the present exemplary embodiment.

As illustrated, the management terminal 100 includes a CPU 101 which is a calculation means, a main memory 102 and a magnetic disk device 103 which are storage means. The CPU 101 executes various programs such as an Operating System (OS) and applications. The main memory 102 is a storage area for storing various programs and data used for execution thereof. The magnetic disk device 103 is a storage area for storing various programs, input data for various programs, output data from various programs, and the like. Then, the CPU 101 loads various programs stored in the magnetic disk device 103 and the like into the main memory 102 and executes them, thereby realizing each function of the management terminal 100.

Further, the management terminal 100 includes a communication interface (communication I/F) 104 for communicating with the outside, a display mechanism 105 including a video memory, a display as an example of a display portion, and the like, and an input device 106 such as a keyboard and a mouse.

Functional Configuration of Management Terminal

Figure 3:
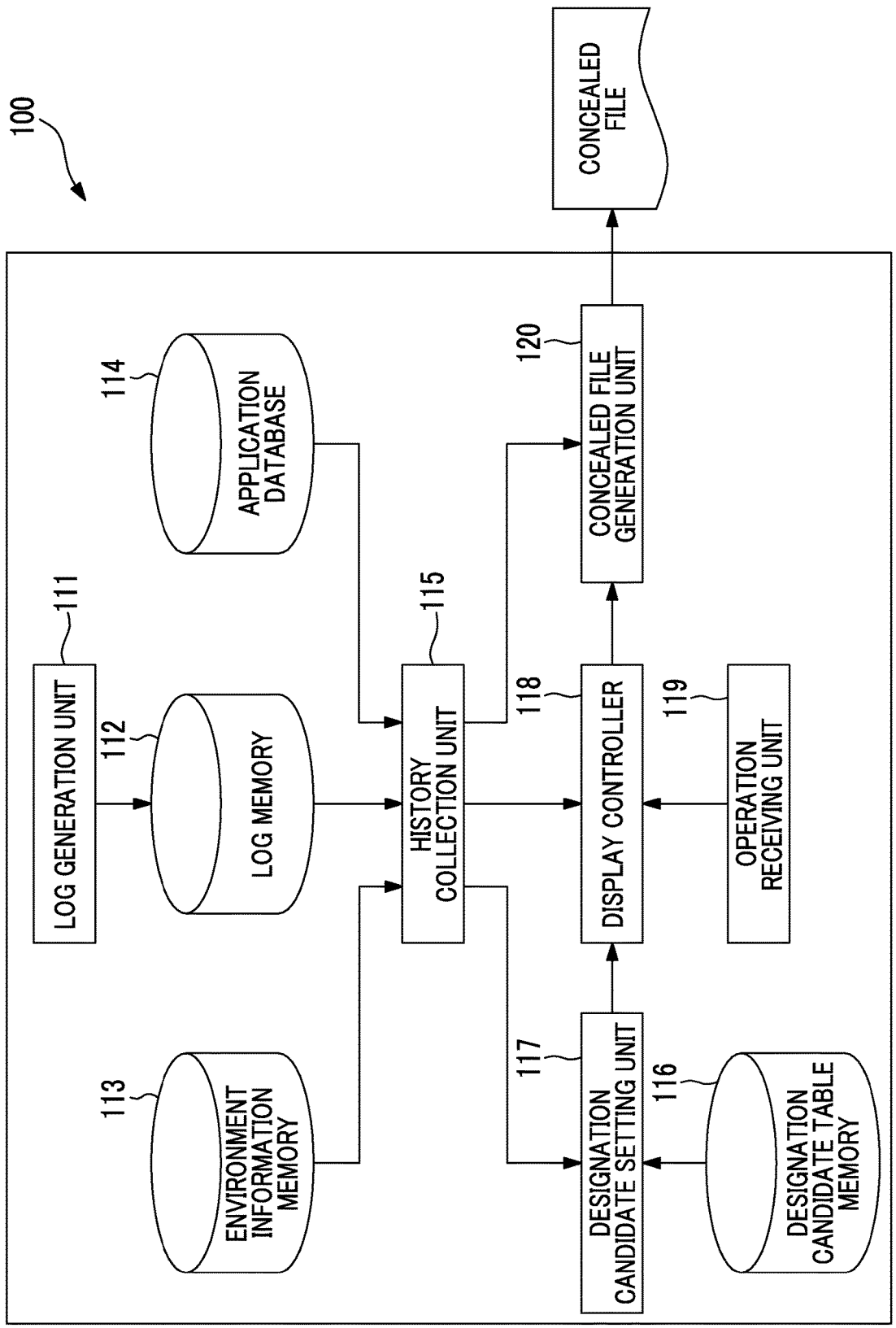
FIG. 3 is a block diagram illustrating an example of a functional configuration of the management terminal according to Exemplary Embodiment 1.

Next, the functional configuration of the management terminal 100 will be described. FIG. 3 is a block diagram illustrating an example of a functional configuration of the management terminal 100 according to Exemplary Embodiment 1.

The management terminal 100 according to the present exemplary embodiment includes a log generation unit 111, a log memory unit 112, an environment information memory 113, an application database 114, a history collection unit 115, a designation candidate table memory 116, a designation candidate setting unit 117, a display control unit 118, an operation receiving unit 119, and a concealed file generation unit 120.

The log generation unit 111 generates a log concerning the process of an application such as a management application and stores the generated log in the log memory unit 112. More specifically, the log generation unit 111 generates log concerning the process of the application such as the internal management executed in the management terminal 100 and the process executed between the management terminal 100, the device 200, and the information management server 300.

The log memory unit 112 is a memory that stores the log generated by the log generation unit 111. In the log memory unit 112, logs generated by the log generation unit 111 are sequentially stored. Hereinafter, the log stored in the log memory unit 112 is referred to as "application log file".

The environment information memory 113 stores the environment information of the management terminal 100. The environment information of the management terminal 100 is the hardware and software information of the management terminal 100, and is, for example, the IP address or the host name of the management terminal 100, the OS installed in the management terminal 100, and memory information. More specifically, the environment information is, for example, information acquired by an "ipconfig" command or a "systeminfo" command which is a command of Windows (registered trademark). Hereinafter, the information stored in the environment information memory 113 is referred to as "PC environment information".

The application database 114 is a database for storing various types of information managed by the management terminal 100. As described above, the application database 114 stores, for example, various types of information on the device 200 acquired from the device 200, such as the model of the device 200, and various types of information acquired from the information management server 300, such as application information. Writing data and reading data in the application database 114 are performed by an application such as management application. Hereinafter, the information stored in the application database 114 is referred to as "application DB information".

The history collection unit 115 collects the application log file stored in the log memory unit 112, the PC environment information stored in the environment information memory 113, and the application DB information stored in the application database 114. The information collected here is information (history) on a monitoring target device (for example, the management terminal 100, the device 200, or the information management server 300), and is used as an example of the first history.

The designation candidate table memory 116 stores a table defining information pieces which are candidates for designation by the operator, as information to be concealed in a case of being output from the management terminal 100. More specifically, the designation candidate table memory 116 stores a table defining information pieces which are candidates for designation by the operator, for each of the application log file, the PC environment information, and the application DB information. Hereinafter, the table defining information pieces which are candidates for designation by the operator will be referred to as "designation candidate table".

In other words, the information pieces which are candidates for designation by the operator is highly confidential information. More specifically, it is information dependent on the operating environment of the operator, in other words, information for specifying device or individual. For example, in a case where the IP address or license key of the management terminal 100 is made public, there is a possibility that the device is specified. In addition, the name and address of the operator are personal information, and in a case where they are made public, individual operator may be specified. Furthermore, the operator's mail address is also information that may specify the individual operator, once it is made public. Therefore, such information is defined in the designation candidate table as information pieces which are candidates for designation by the operator.

Meanwhile, for example, predetermined information in an application such as a management application, in other words, information not dependent on the operating environment of the operator, does not correspond to information specifying device or individual. For example, the information such as the name of the application provided by the information management server 300, the version of the application, and the model of the device 200 is information which does not change depending on the operating environment of the operator, but is provided by the information management server 300 and the device 200. Such information is not regarded as candidates for designation by the operator and is not defined in the designation candidate table. The designation candidate table is prepared in advance by an administrator or the like of the information processing system 1.

The designation candidate setting unit 117 refers to the designation candidate table, for each of the application log file, the PC environment information, and the application DB information. Then, the designation candidate setting unit 117 sets information defined as candidates for designation by the operator in the designation candidate table, among the information included in the history collected by the history collection unit 115, as candidates for designation by the operator. In the present exemplary embodiment, information set as candidates for designation by the operator is used as an example of information satisfying a predetermined condition.

The display control unit 118 outputs data for displaying an image on the display of the display mechanism 105, and controls the display of the display. For example, the display control unit 118 displays on the display a screen including at least a part of the history collected by the history collection unit 115 (hereinafter, referred to as a history screen), and presents the screen to the operator. The history screen is displayed every time the history collection unit 115 collects a history (that is, for each collected history).

The operation receiving unit 119 receives an operator's operation with a touch panel, a mouse, or the like. For example, the operation receiving unit 119 receives, on the history screen displayed on the display, an operation of designating information that the operator desires to conceal, among the information collected by the history collection unit 115.

The concealed file generation unit 120 performs a process of concealing the information designated by the operator in the history collected by the history collection unit 115 and generates a history in which the information designated by the operator is concealed. Here, the process of concealing the designated information is a process for preventing designated information from being included, for example, a process of deleting the designated information, or a process of replacing the designated information with different information. However, any process may be used as long as a process is performed so as not to include the designated information. Hereinafter, the history of concealing the information designated by the operator is referred to as "concealed file". Information on this concealed file is used, for example, for investigating a failure occurring in the monitoring target device. Further, in the present exemplary embodiment, the concealed file is used as an example of the second history.

Each functional unit of the management terminal 100 is realized by cooperation of software and hardware resources. Specifically, in a case where the management terminal 100 is realized by the hardware configuration shown in FIG. 2, the respective functional units such as the log generation unit 111, the history collection unit 115, the designation candidate setting unit 117, the display control unit 118, the operation receiving unit 119, and the concealed file generation unit 120 are realized, for example, by the OS program and the management application stored in the magnetic disk device 103, or the like being read into the main memory 102 and executed by the CPU 101. Further, the log memory unit 112, the environment information memory 113, the application database 114, and the designation candidate table memory 116 are realized by the magnetic disk device 103 or the like, for example.

In the present exemplary embodiment, as an example of a collection unit, the history collection unit 115 is used. As an example of a display, the display control unit 118 is used. As an example of a receiving unit, the operation receiving unit 119 is used. As an example of a generation unit, the concealed file generation unit 120 is used.

Processing Procedure for Generating Concealed File

Figure 4:
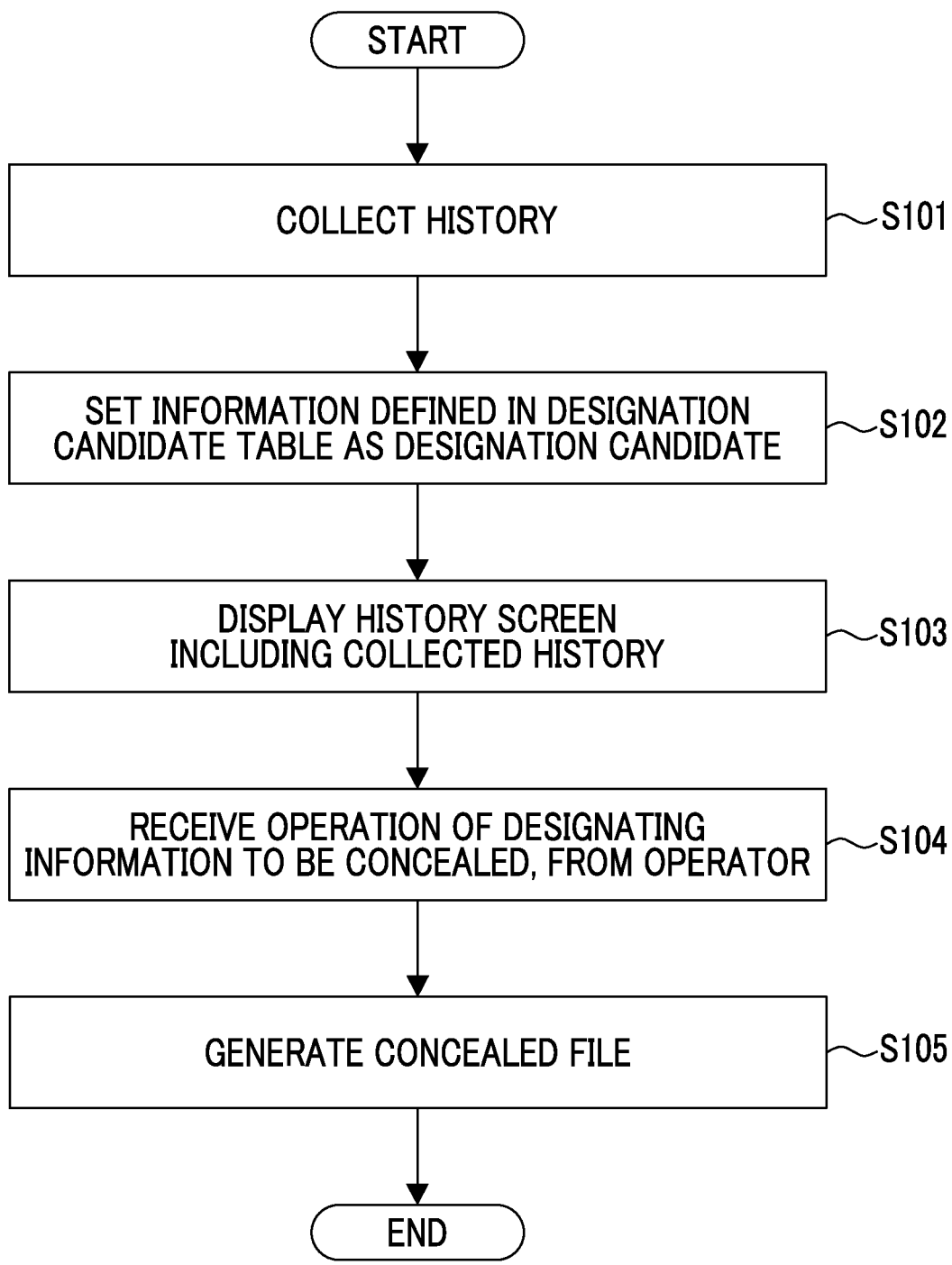
FIG. 4 is a flowchart showing an example of a processing procedure for generating a concealed file based on an operator's operation in Exemplary Embodiment 1.

Next, a series of flows of a process of receiving an operator's operation to designate information to be concealed and generating a concealed file will be described. FIG. 4 is a flowchart showing an example of a processing procedure for generating a concealed file based on an operator's operation in Exemplary Embodiment 1.

For example, in a case where the operator performs an operation of collecting information stored in the management terminal 100, the history collection unit 115 collects the history (namely, log application log file, PC environment information, and application DB information) (Step S101). Next, the designation candidate setting unit 117 refers to the designation candidate table for each of the application log file, the PC environment information, and the application DB information, and sets the information defined in the designation candidate table, among the information included in the history collected by the history collection unit 115, as candidates for designation by the operator (Step S102).

Next, the display control unit 118 displays a history screen including the history collected by the history collection unit 115 on the display (Step S103). Next, the operation receiving unit 119 receives an operator's operation to designate information to be concealed, on the history screen (Step S104). Here, the operation receiving unit 119 is controlled so as to receive the designation by the operator for the information which is set as the candidates for designation by the designation candidate setting unit 117, and not to receive the designation by the operator for the information that is not set as the candidate for designation.

Next, for example, in a case where the operator performs an operation to instruct generation of a concealed file, the concealed file generation unit 120 generates a concealed file (Step S105). Here, the concealed file generation unit 120 searches for information designated by the operator from the information included in the history collected by the history collection unit 115 by, for example, pattern matching. Further, the concealed file generation unit 120 performs a process of concealing the information found by the search in the history collected by the history collection unit 115 and generates a concealed file. Then, the process flow ends.

Description of Designation Candidate Table

Next, a designation candidate table will be described. FIG. 5A is a diagram showing an example of a designation candidate table for an application log file. Further, FIG. 5B is a diagram showing an example of a designation candidate table for application DB information.

First, a designation candidate table of an application log file will be described with reference FIG. 5A. "Keyword" is a text string for specifying the range of the log. That is, a part (or all) of the application log file is specified by designating the keyword. "Data key" is an item for specifying information to be candidates for designation by the operator.

More specifically, in the application log file, the data key and the variable (value) are recorded in association with each other in pairs. The variable is set as a changeable value and is placed after the text string of the data key, in association with the data key. Therefore, in the application log file, the variable corresponding to the data key defined in the "data key" item is handled as the designation candidate.

For example, in the case of the data key "emails", the variable corresponding to the data key "emails", in other words, the mail address recorded in association with "emails" is handled as a designation candidate.

By narrowing the range of logs by "keywords", it is possible to more accurately specify the variable which is the designation candidate, as compared with the case where the log range is not narrowed. However, it is possible to specify the variable corresponding to the "data key", without narrowing the range of the log by "keyword". Therefore, "keywords" may not be defined in the designation candidate table.

Next, a designation candidate table of application DB information will be described with reference FIG. 5B. Here, the "table name" is the name of the table included in the application DB information. "Column name" is the name of a column in the table. More specifically, among the information in the table defined by "table name", the information included in the column defined by "column name" is handled as a designation candidate.

For example, in the case of the table name "DeviceInfo", the IP address included in the column of the column name "IP_ADDRESS", the user ID included in the column of the column name "ID_NAME", and the password included in the column of the column name "PASSWORD", among the information on the table of the table name "DeviceInfo", are handled as designation candidates.

Although not shown here, the designation candidate table for PC environment information is also prepared. In the PC environment information, for example, variables recorded in association with predetermined items such as "IP address" and "host name" are handled as designation candidates.

The configuration of the designation candidate table is not limited to those shown in FIG. 5A and FIG. 5B. Any configuration may be used as long as information to be candidates for designation by the operator is specified among the application log file, the application DB information, and the PC environment information. For example, a regular expression may be defined in advance, and a text string matching the regular expression may be handled as a designation candidate.

Specific Example of History Screen

Next, a history screen including the history collected by the history collection unit 115 will be described with a specific example. On the history screen, the application log file, the PC environment information, and the application DB information are displayed.

Figure 6:
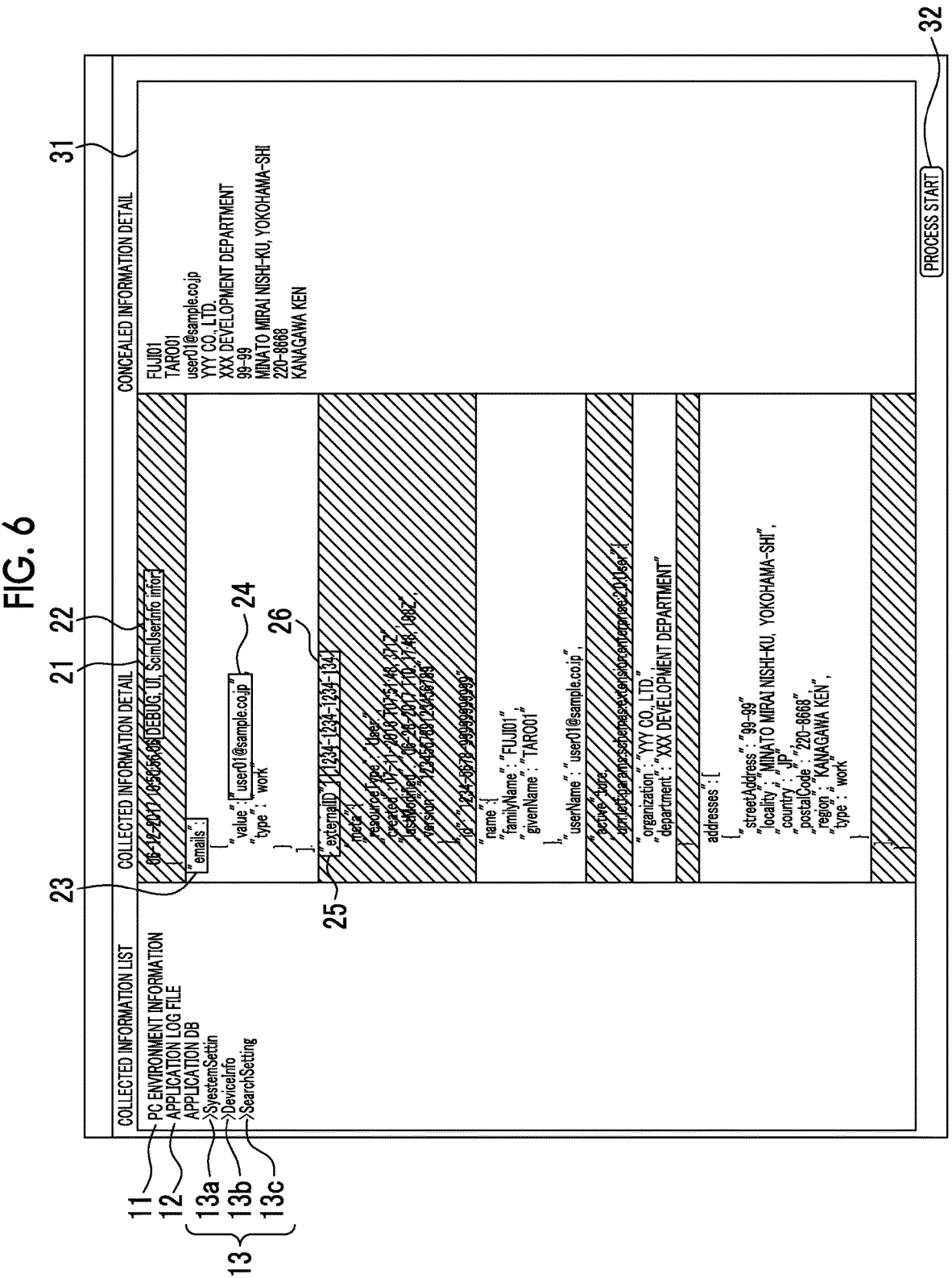
FIG. 6 is a diagram showing a display example of the application log file.

FIG. 6 is a diagram showing a display example of the application log file. The example shown in FIG. 6 is configured such that a PC environment information item 11, an application log file item 12, and an application DB information item 13 can be selected as a collected information list. Then, as the operator selects the item 12, the application log file is displayed in the display area 21 of the collected information detail.

"DEBUG, UI, ScimUserinfo info:" shown in the area 22 is a keyword. "emails" shown in the area 23 is a data key. "user01@sample.co.jp" shown in the area 24 is recorded as a variable corresponding to the data key "emails". Here, in the designation candidate table of the application log file, as shown in FIG. 5A, in a case where the keyword "DEBUG, UI, ScimUserinfo info:" and the data key "emails" are defined, "User01@sample.co.jp" which is a variable corresponding to the data key "emails" is handled as a designation candidate.

Therefore, for example, in a case where the operator designates a text string "user01@sample.co.jp", the text string "user01@sample.co.jp" is added in the area 31 of the confidential information list. More specifically, for example, by the operator dragging the text string "user01@sample.co.jp" to move to the area 31, the text string "user01@sample.co.jp" is added in the area 31.

Similarly, for example, in the designation candidate table, as shown in FIG. 5A, in a case where the data keys "name", "userName", "organization", "department", and "addresses" are defined, variables corresponding to the respective data keys are handled as designation candidates.

In the example shown in FIG. 6, the variables corresponding to the data key "name" are "Fuji01" and "Taro01". The variable corresponding to the data key "userName" is "user01@sample.co.jp". The variable corresponding to the data key "organization" is "YYY Co., Ltd.". The variable corresponding to the data key "department" is "XXX development department". Variables corresponding to the data key "addresses" are "99-99", "Minato Mirai Nishi-ku, Yokohama-shi", "220-8668", "Kanagawa ken". Then, the operator designates these variables as information to be concealed, so that the designated information is added to the area 31 of the confidential information list.

Further, for example, "externalID" shown in an area 25 is also a data key, "1234-1234-1234-1234" shown in an area 26 is recorded as a variable corresponding to the data key "externalID". However, the data key "externalID" is not defined in the designation candidate table of the application log file. Therefore, the variable "1234-1234-1234-1234" is not handled as a candidate for designation and controlled so as not to receive designation by the operator. More specifically, for example, a drag operation is not performed even in a case where the operator designates the variable "1234-1234-1234-1234", or a warning screen for notifying the operator that it is not a designated candidate is displayed in a case where the variable "1234-1234-1234-1234" is specified.

Further, in order to facilitate identification on the history screen whether or not it is a candidate for designation by the operator, an area including information which is a candidate for designation by the operator and an area not including information which is a candidate for designation by the operator may be displayed in different display modes. That is, information that is a candidate for designation by the operator and information that is not a candidate for designation by the operator may be displayed in different display modes.

In the example shown in FIG. 6, the hatched area is an area including information that is not a designation candidate, in other words, an area including a data key not defined in the designation candidate table and a variable corresponding to the data key. For example, while the background of the area including the information on the designation candidate is displayed in white, the background of the area including the information which is not the designated candidate is displayed in gray.

FIG. 7 is a diagram showing a display example of the application DB information. In the example shown in FIG. 7, the application DB information includes three tables of table names "SystemSetting", "DeviceInfo", and "SearchSetting". In a case where the operator selects the item 13*b* from among a "SystemSetting" item 13*a*, a "DeviceInfo" item 13*b*, and a "SearchSetting" item 13*c*, the information on the table of the table name "DeviceInfo" is displayed in the display area 21.

The table of the table name "DeviceInfo" has five columns whose column names are "PRIVATE_KEY", "SERIAL_NUMBER", "IP_ADDRESS", "ID_NAME", and "PASSWORD". Here, in the designation candidate table of the application DB information, as shown in FIG. 5B, in a case where the table name "DeviceInfo" and the column names "IP_ADDRESS", "ID_NAME", and "PASSWORD" are defined, information pieces included in the three columns is handled as designation candidates. Then, the operator designates information included in these columns as information to be concealed, so that the designated information is added to the area 31 of the confidential information list.

In the example shown in FIG. 7, "172.27.59.80" shown in the area 27, "Administrator0" shown in the area 28 and "password0" shown in the area 29 are designated by the operator as information to be concealed, and they are added in the area 31. In addition to the information designated in the application log files such as "Fuji01" and "Taro01", "172.27.59.80", "Administrator0", and "password0" are added as information to be concealed.

On the other hand, the column names "PRIVATE_KEY" and "SERIAL_NUMBER" are not defined in the designation candidate table of the application DB information. Therefore, the information included in the two columns is not handled as a designated candidate and controlled so as not to receive designation by the operator. As in the example shown in FIG. 6, the information on the designation candidate by the operator and the information which is not the designation candidate may be displayed in different display modes. In the example shown in FIG. 7, the information included in the column names "PRIVATE_KEY" and "SERIAL_NUMBER" is hatched, for example, the background is displayed in gray.

Although not shown in FIG. 7, even in the PC environment information, in a case where there is candidate designated by the operator as information to be concealed, it is added in the area 31 of the confidential information list.

As the operator selects the "process start" button 32, the concealed file generation unit 120 generates a concealed file. Here, the concealed file generation unit 120 performs a process of concealing the information indicated in the area 31 of the confidential information list, in the application log file, the application DB information, and the PC environment information collected by the history collection unit 115. Specifically, for example, a process of deleting the text string "Fuji01" in the application log file or replacing the text string "Fuji01" with a different text string such as "****" is performed.

Further, even in a case where the text string of "Fuji01" is included in the application DB information or the PC environment information other than the application log file, a process of concealing the text string of "Fuji01" is performed. That is, with respect to the information designated by the operator in any of the application log file, the application DB information, and the PC environment information, a process of concealing is performed in all of the application log file, the application DB information, and the PC environment information.

In the examples shown in FIG. 6 and FIG. 7, the information which is the designation candidate by the operator and the information which is not the designation candidate are displayed in different display modes. However, for example, the information which is not a designation candidate may not be displayed on the history screen. In this case, for example, the hatched area in FIG. 6 and the hatched area in FIG. 7 are not displayed.

Furthermore, as the history screen, information that is a candidate for designation by the operator may be displayed as a list. FIG. 8 is a diagram showing an example of a list screen of information that is a candidate for designation by the operator.

In the example shown in FIG. 8, based on the designation candidate table, from the application log file, "Fuji01", "Taro01", "user01@sample.co.jp", "YYY Corporation", "XXX development department", "99-99", "Minato Mirai Nishi-ku, Yokohama-shi", "220-8668", "Kanagawa-ken" are extracted as designation candidates. Further, based on the designation candidate table, "172.27.59.80", "172.27.59.81", "172.27.59.82", "172.27.59.83", "172.27.59.84", "172.27.59.85", "172.27.59.86", "Administrator0", "Administrator1", and "password0" are extracted as designation candidates from the application DB information. The operator may designate information to be concealed on this screen.

The list screen of the information that is the candidate for designation by the operator may be displayed in addition to the history screen of FIG. 6 or FIG. 7 (that is, the screen including the application log file, PC environment information, and application DB information), or only the list screen of the designated candidates may be displayed, instead of displaying the history screen of FIG. 6 or FIG. 7.

Furthermore, the information designated as the information to be concealed by the operator may be stored, and used after the next time. For example, in a case where the history screen is displayed, the information designated by the operator as information to be concealed in the past is displayed in the area 31 of the confidential information list from the beginning or displayed as a list on another screen.

Figure 9:
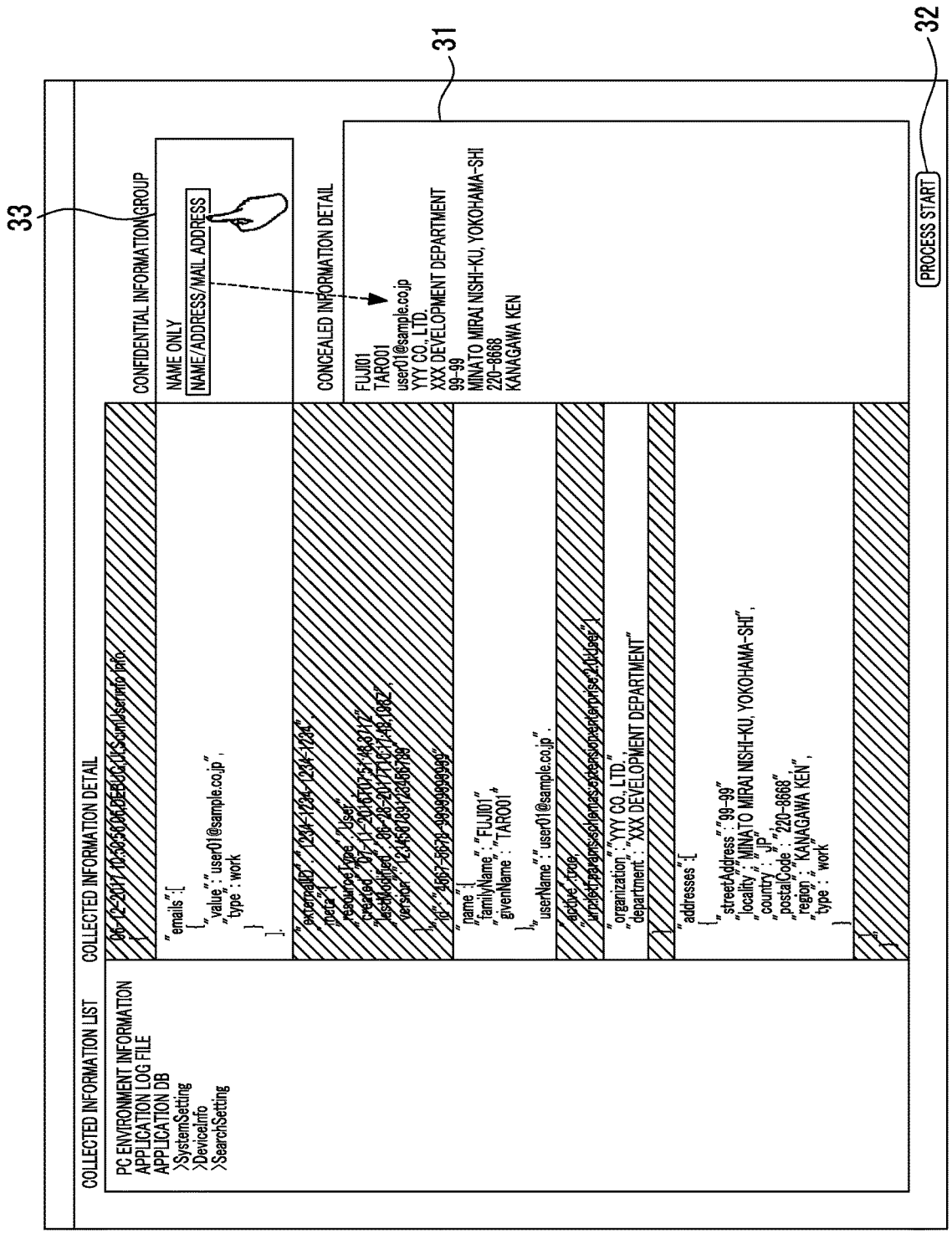
FIG. 9 is a diagram showing a display example in a case of grouping information to be concealed.

In addition, it is also possible to allow information to be concealed to be grouped, and the operator selects a group according to the situation, thereby designating information to be concealed. FIG. 9 is a diagram showing a display example in a case of grouping information to be concealed.

On the history screen shown in FIG. 9, an area 33 in which the confidential information group is displayed is provided. In the area 33, a group generated by the operator or the like is displayed. In the example shown in FIG. 9, two groups "name only" and "name/address/mail address" are generated. In a case where the operator selects a group, the information on the selected group is designated as information to be concealed and displayed in the area 31.

For example, information pieces on the name, the address, and the mail address are designated as information to be concealed, by a group of "name/address/mail address". More specifically, in a case where the operator selects a group of "name/address/mail address", information on the name, the address, and the mail address are extracted in the application log file, the application DB information, and the PC environment information. In the example shown in FIG. 9, information "Fuji01", "Taro01", "user01@sample.co.jp", "YYY Corporation", "XXX development department", "99-99", "Minato Mirai Nishi-ku, Yokohama-shi", "220-8668", "Kanagawa-ken" are extracted. Then, the extracted information is designated as information to be concealed and displayed in the area 31.

As a method of extracting these types of information, for example, there is a method of previously determining a condition for corresponding to a name, an address, and a mail address, and extracting information satisfying the condition. For example, it is considered that "province name" or "city name" may be predetermined as an address, or a text string including @ may be predetermined as a mail address. In the case of an application log file, variables recorded in association with data keys such as a name, an address, and a mail address may be extracted.

Furthermore, in a case where the operator selects a group, only the information on the selected group may be designated as the information to be concealed or in a case where there is information that has been already designated as information to be concealed, in addition to the information, the information on the selected group may be designated as information to be concealed. In addition to the information on the selected group after the operator selects the group, other information may be additionally designated as information to be concealed.

As described above, in the present exemplary embodiment, the management terminal 100 collects histories related to the monitoring target device and displays a history screen including the histories. Here, the management terminal 100 handles the information defined in the designation candidate table as a candidate for designation by the operator, and receives an operation to designate information to be concealed. Then, the management terminal 100 generates a concealed file in which the information designated by the operator is concealed.

Exemplary Embodiment 2

Next, Exemplary Embodiment 2 will be described.

The concealed file generated by the concealed file generation unit 120 is made public, and is used, for example, for investigating a failure occurring in the monitoring target device. Here, in a case where the operator conceals the information included in the history more than necessary, it may be difficult to investigate the failure. Thus, in Exemplary Embodiment 2, in a case where a failure occurs in the monitoring target device, information to be a candidate for designation by the operator is restricted based on the failure.

Since Exemplary Embodiment 2 has common configurations and functions to Exemplary Embodiment 1, the same reference numerals are used for the common configurations, and the explanation and illustration of common configurations and functions will be omitted.

Functional Configuration of Management Terminal

Figure 10:
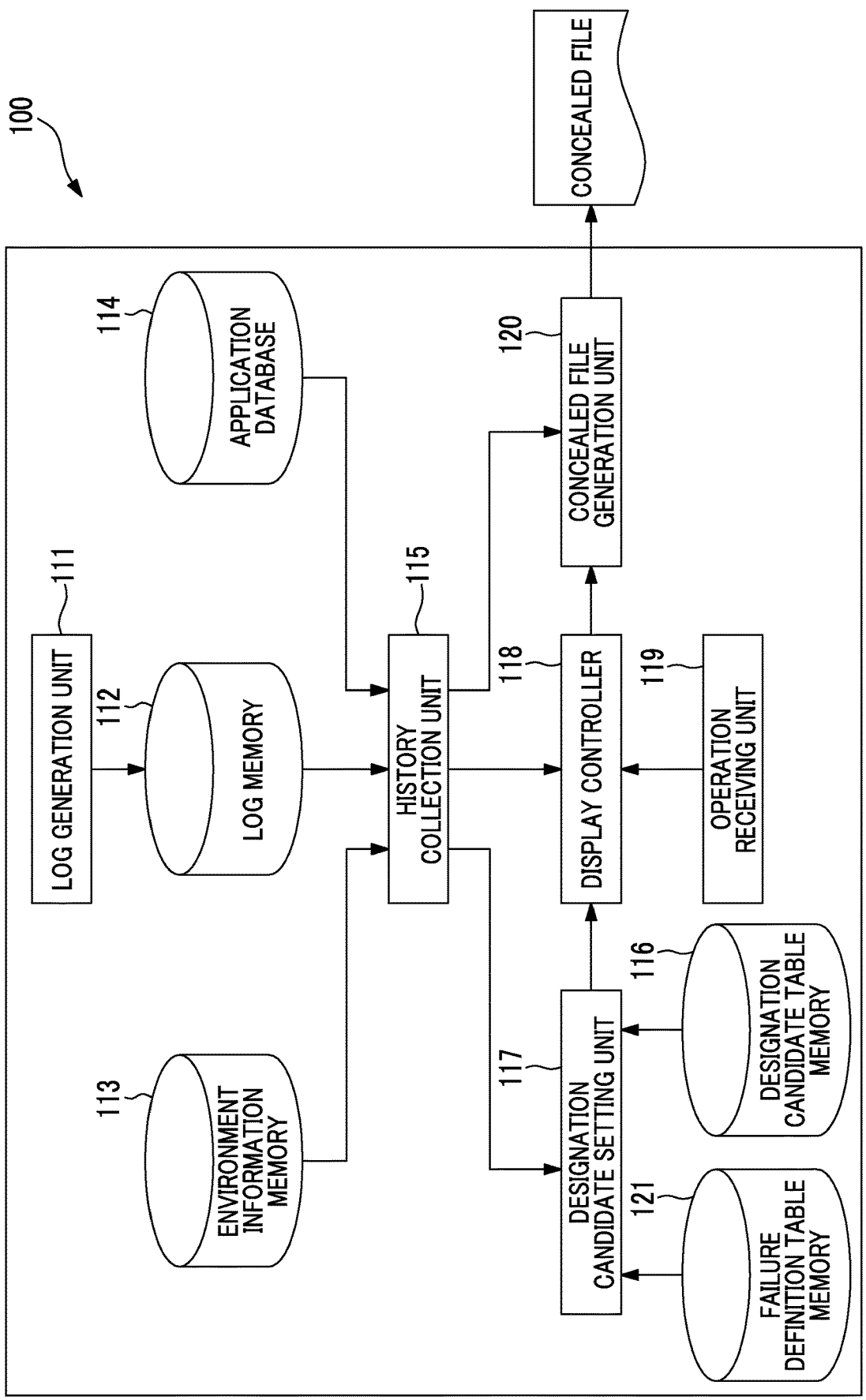
FIG. 10 is a block diagram illustrating an example of a functional configuration of the management terminal according to Exemplary Embodiment 2.

FIG. 10 is a block diagram illustrating an example of a functional configuration of the management terminal 100 according to Exemplary Embodiment 2. In the management terminal 100 according to the present exemplary embodiment, the management terminal 100 according to Exemplary Embodiment 1 further includes a failure definition table memory 121.

The failure definition table memory 121 stores a table in which a failure occurring in a monitoring target device is associated with information that is not a candidate for designation by the operator in the case of occurrence of the failure (hereinafter referred to as a failure definition table). The failure definition table is determined in advance by the administrator or the like of the information processing system 1. In other words, the information that is not the candidates for designation is the information used for investigating the failure, in other words, the information necessary for investigating the failure (or the information highly likely to be required for investigating the failure). Since such information varies depending on the contents of the failure and the type of the failure, it is determined according to the failure (or depending on the type of the failure).

The designation candidate setting unit 117 restricts the information to be candidate for designation by the operator in the history collected by the history collection unit 115, in a case where a failure occurs in the monitoring target device. More specifically, in a case where a failure occurs in the monitoring target device, the designation candidate setting unit 117 sets whether or not the information included in the history collected by the history collection unit 115 is a candidate for designation by the operator, based on the designation candidate table and the failure definition table. Here, the designation candidate setting unit 117 sets the information defined in the designation candidate table for each of the application log file, the PC environment information, and the application DB information, as candidates for designation. However, the designation candidate setting unit 117 refers to the failure definition table and performs control such that the information associated with the failure occurring in the monitoring target device is not set as the candidate for designation by the operator. In the present exemplary embodiment, the designation candidate setting unit 117 is used as an example of a restriction unit.

Description of Processing Procedure for Generating Concealed File

Figure 11:
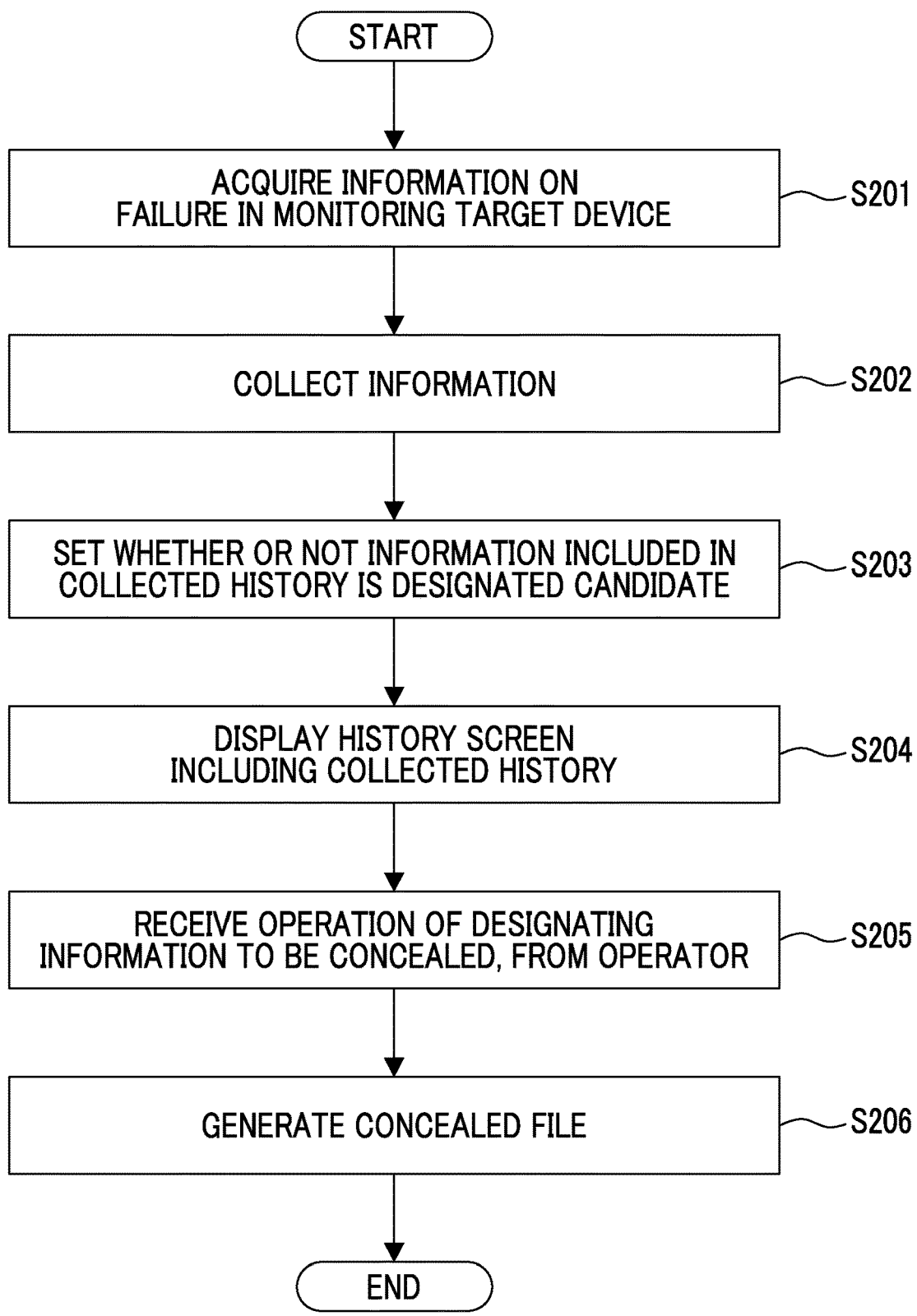
FIG. 11 is a flowchart showing an example of a processing procedure for generating a concealed file based on an operator's operation in Exemplary Embodiment 2.

Next, a series of flows of a process of receiving an operator's operation to designate information to be concealed and generating a concealed file will be described. FIG. 11 is a flowchart showing an example of a processing procedure for generating a concealed file based on an operator's operation in Exemplary Embodiment 2.

First, in a case where a failure occurs in monitoring target device, the designation candidate setting unit 117 acquires information on the occurred failure (Step S201). Here, for example, in a case where the operator inputs information on the failure to the management terminal 100, the designation candidate setting unit 117 acquires information on the failure. Further, for example, the designation candidate setting unit 117 may acquire information on a failure, from the application log file stored in the log memory unit 112. In this case, for example, a table in which the contents of the logs generated in a case where a failure occurs is associated with the information on the failure is prepared in advance. Then, the designation candidate setting unit 117 monitors the application log file stored in the log memory unit 112, and detects the occurrence of a failure based on a prepared table in a case where a failure occurs, and acquires information on the failure depicted on the table.

Next, for example, in a case where the operator performs an operation of collecting information stored in the management terminal 100, the history collection unit 115 collects the history (namely, log application log file, PC environment information, and application DB information) (Step S202).

Next, the designation candidate setting unit 117 sets whether or not the information included in the history collected by the history collection unit 115 is a candidate for designation by the operator (Step S203). Here, the designation candidate setting unit 117 refers to the designation candidate table for each of the application log file, the PC environment information, and the application DB information, and sets the information defined in the designation candidate table, among the information included in the history collected by the history collection unit 115, as a candidate for designation. However, the designation candidate setting unit 117 refers to the failure definition table, and sets information corresponding to the occurred failure not to be a candidate for designation, based on the information on the failure acquired in Step S101.

The subsequent processes of Steps S204 to S206 are the same as the processes of Steps S103 to S105 shown in FIG. 4, so the explanation is omitted here.

Description of Failure Definition Table

Next, a failure definition table will be described. FIG. 12 is a diagram showing an example of a failure definition table for application DB information. And although not shown here, a failure definition table for an application log file and a failure definition table for PC environment information may be prepared of course.

"Contents of occurred failure" is information on a failure acquired by the designation candidate setting unit 117 due to operator's input or the like. "Concealment restriction table" is the name of a table excluded from candidates for designation by the operator from tables included in the application DB information. For example, in a case where a failure occurs during installation of an application in the device 200, information included in the "DeviceInfo" table is excluded from candidates for designation.

The configuration of the failure definition table is not limited to that shown in FIG. 12. Any configuration may be used as long as information excluded from candidates for designation by the operator, among the application log file, the application DB information, and the PC environment information, is specified according to the occurred failure.

Specific Example of History Screen

Next, a history screen according to the present exemplary embodiment will be described with a specific example. FIG. 13 is a diagram showing a display example of the application DB information. In the example, it is assumed that a failure occurs when installing the application on the device 200. Here, as shown in FIG. 12, in the failure definition table of the application DB information, in a case where the table name "DeviceInfo" is defined as the "concealment restriction table" at the occurrence of the failure, information included in the table of "DeviceInfo" is excluded from candidates for designation.

In addition, for example, in a case where candidates for designation are set based on the designation candidate table, as shown in FIG. 7, in the table of the table name "DeviceInfo", the information of each of columns of the column names "IP_ADDRESS", "ID_NAME", and "PASSWORD" is handled as a candidate for designation, and the information of each of columns of the column names "PRIVATE_KEY" and "SERIAL_NUMBER" is not handled as a candidate for designation.

However, as a failure occurs during installation of the application in the device 200, information included in the table of "DeviceInfo" is excluded from candidates for designation, based on the failure definition table. Therefore, the information in each of columns of the column names "IP_ADDRESS", "ID_NAME", and "PASSWORD" is not handled as a candidate for designation. That is, the information included in the "DeviceInfo" table is controlled so as not to receive designation of concealment by the operator. In the example shown in FIG. 13, the information included in the table of "DeviceInfo" is hatched, and for example, the background is displayed in gray.

As described above, in the present exemplary embodiment, in a case where a failure occurs in the monitoring target device, the management terminal 100 restricts information to be candidates for designation by the operator, based on the failure.

In Exemplary Embodiment 2, in the above-described example, the designation candidate is set based on the designation candidate table and failure definition table. However, a table in which the contents of the designation candidate table and failure definition table are collected may be prepared. In this table, for example, information to be a candidate for designation by the operator is defined according to a failure. In addition, for example, information excluded from candidates for designation by the operator may be defined according to a failure.

Further, in Exemplary Embodiment 1 and Exemplary Embodiment 2, in the examples described above, a designation candidate table defining information to be candidates for designation by the operator is prepared, but a table defining information not to be candidates for designation by the operator (hereinafter, referred to as a non-designated candidate table) may be prepared. In the non-designated candidate table, for example, predetermined information in an application such as a management application is defined, as the information not to be candidates for designation by the operator. Then, the designation candidate setting unit 117 sets the information defined in the non-designated candidate table not to be a candidate for designation by the operator, or sets the information not defined in the non-designated candidate table as a candidate for designation by the operator.

In addition, in the case of Exemplary Embodiment 1, a non-designated candidate table is prepared, instead of the designation candidate table or in addition to the designation candidate table. Based on these tables, setting of information to be designated as a candidate for designation by the operator and setting of information not to be a candidate for designation by the operator are performed.

In the case of Exemplary Embodiment 2, a failure definition table is prepared, and a non-designated candidate table is prepared, instead of the designation candidate table or in addition to the designation candidate table. Based on these tables, setting of information to be designated as a candidate for designation by the operator and setting of information not to be a candidate for designation by the operator are performed.

More specifically, for example, information that is not a candidate for designation is set based on the non-designated candidate table, and then information that is not a candidate for designation is additionally set based on the failure definition table, according to the occurred failure. A table summarizing the contents of the failure definition table and the non-designated candidate table may be prepared, or a table summarizing the contents of the failure definition table, the non-designated candidate table, and the designation candidate table may be prepared.

Further, the program realizing the exemplary embodiment of the present invention may be provided not only by a communication means but also by being stored in a recording medium such as a CD-ROM.

Although various exemplary embodiments and modifications have been described above, it goes without saying that these exemplary embodiments and modification examples may be combined.

Further, the present disclosure is not limited to the above exemplary embodiment at all, and may be implemented in various forms without departing from the gist of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to collect a first history on a monitoring target device;
display a history screen including at least a part of the collected first history on a display;
receive an operator's operation to designate information included in the first history, on the displayed history screen;
generate a second history in which the designated information designated by the operator is concealed, from the first history; and
restrict information to be a candidate for designation by the operator in the first history, in a case where a failure occurs in the monitoring target device,
wherein the display displays an area including information which is a candidate for designation by the operator and an area not including information which is a candidate for designation by the operator, in different display modes, on the history screen.

2. The information processing apparatus according to claim 1,
wherein the history screen is a screen showing as a list, information pieces which are candidates for designation by the operator among the information included in the first history.

3. The information processing apparatus according to claim 1,
wherein the receiving unit receives an operation of designating information satisfying a predetermined condition, and does not receive an operation of designating information that does not satisfy the predetermined condition, among the information included in the first history.

4. The information processing apparatus according to claim 3,
wherein the information satisfying the predetermined condition is information specifying device or individual.

5. The information processing apparatus according to claim 3,
wherein the information satisfying the predetermined condition is a variable set as a changeable value.

6. The information processing apparatus according to claim 5,
wherein the variable is a variable placed after a predetermined text string in the first history, in association with the text string.

7. The information processing apparatus according to claim 1,
wherein the processor restricts information, which is previously associated with the occurred failure, so as not to be a candidate for designation by the operator.

* * * * *